US008457812B2

(12) United States Patent
Zammit-Mangion et al.

(10) Patent No.: US 8,457,812 B2
(45) Date of Patent: Jun. 4, 2013

(54) METHOD AND SYSTEM FOR RESOLVING TRAFFIC CONFLICTS IN TAKE-OFF AND LANDING

(76) Inventors: David Zammit-Mangion, Mellieha (MT); Brian Zammit, Mosta (MT); Andrew Sammut, Iklin (MT)

( * ) Notice: Subject to any disclaimer, the term of this patent is extended or adjusted under 35 U.S.C. 154(b) by 149 days.

(21) Appl. No.: 12/486,764

(22) Filed: Jun. 18, 2009
(Under 37 CFR 1.47)

(65) Prior Publication Data

US 2010/0324755 A1 Dec. 23, 2010

(30) Foreign Application Priority Data

Jun. 20, 2008 (MT) ........................................... 4225

(51) Int. Cl.
*G06T 19/00* (2011.01)

(52) U.S. Cl.
USPC ............................................ 701/15; 701/301

(58) Field of Classification Search
USPC .................................... 701/15, 301; 340/945
See application file for complete search history.

(56) References Cited

U.S. PATENT DOCUMENTS

| | | | | |
|---|---|---|---|---|
| 5,629,691 | A | 5/1997 | Jain | |
| 6,486,825 | B1 | 11/2002 | Smithey | |
| 6,606,563 | B2 | 8/2003 | Corcoran, III | |
| 6,614,397 | B2 * | 9/2003 | Pullen et al. | 342/456 |
| 6,804,607 | B1 * | 10/2004 | Wood | 701/301 |
| 6,850,185 | B1 | 2/2005 | Woodell | |
| 6,915,188 | B2 * | 7/2005 | Koncelik, Jr. | 701/9 |
| 6,920,390 | B2 | 7/2005 | Mallet et al. | |
| 6,927,701 | B2 * | 8/2005 | Schmidt et al. | 340/959 |
| 7,109,889 | B2 * | 9/2006 | He | 340/971 |
| 7,117,089 | B2 | 10/2006 | Khatwa et al. | |
| 7,206,698 | B2 | 4/2007 | Conner et al. | |
| 7,363,145 | B2 | 4/2008 | Conner et al. | |
| 7,385,527 | B1 | 6/2008 | Clavier et al. | |
| 7,436,323 | B2 * | 10/2008 | Ishihara et al. | 340/951 |
| 7,479,925 | B2 | 1/2009 | Schell | |
| 7,535,404 | B2 | 5/2009 | Corrigan | |
| 7,555,372 | B2 * | 6/2009 | Dwyer | 701/16 |
| 7,580,776 | B1 * | 8/2009 | McCusker et al. | 701/3 |
| 7,813,845 | B2 * | 10/2010 | Doose et al. | 701/16 |
| 7,860,641 | B2 * | 12/2010 | Meunier | 701/120 |
| 2002/0075171 | A1 * | 6/2002 | Kuntman et al. | 340/961 |
| 2002/0089432 | A1 * | 7/2002 | Staggs et al. | 340/945 |
| 2002/0109625 | A1 * | 8/2002 | Gouvary | 342/29 |
| 2003/0033084 | A1 * | 2/2003 | Corcoran, III | 701/301 |
| 2003/0090420 | A1 * | 5/2003 | Pullen et al. | 342/454 |
| 2004/0145499 | A1 * | 7/2004 | Schmidt et al. | 340/947 |
| 2004/0225440 | A1 * | 11/2004 | Khatwa et al. | 701/301 |
| 2006/0195235 | A1 * | 8/2006 | Ishihara et al. | 701/16 |
| 2006/0214816 | A1 * | 9/2006 | Schell | 340/961 |

(Continued)

OTHER PUBLICATIONS

NOVA 9000 RIMCAS, Northrop Grumman. Brochure. http://www.parkeirsystems.com/index2.php?option=com_docman&task=doc_view&gid=96&ItemId=90 accessed May 5, 2011.

*Primary Examiner* — Helal A Algahaim
(74) *Attorney, Agent, or Firm* — Harness, Dickey & Pierce, P.L.C.

(57) ABSTRACT

A method and system for resolving existing and potential traffic conflicts that may occur during take-off and landing in aviation that includes means of monitoring movements on the runway, its approaches and environs to determine whether a conflict or potential conflict exists, means to resolve a conflict and to generate an output pertaining to this resolution.

21 Claims, 6 Drawing Sheets

U.S. PATENT DOCUMENTS

| | | | | |
|---|---|---|---|---|
| 2006/0265109 | A1* | 11/2006 | Canu-Chiesa et al. | 701/3 |
| 2007/0043483 | A1* | 2/2007 | Bagge et al. | 701/16 |
| 2007/0050101 | A1* | 3/2007 | Sacle et al. | 701/11 |
| 2007/0067093 | A1* | 3/2007 | Pepitone | 701/120 |
| 2007/0142982 | A1* | 6/2007 | Lorido et al. | 701/16 |
| 2008/0027596 | A1* | 1/2008 | Conner et al. | 701/16 |
| 2008/0109163 | A1* | 5/2008 | Stone et al. | 701/211 |
| 2008/0140269 | A1* | 6/2008 | Naimer et al. | 701/7 |
| 2008/0169941 | A1* | 7/2008 | He | 340/971 |
| 2008/0215198 | A1* | 9/2008 | Richards | 701/15 |
| 2008/0262665 | A1* | 10/2008 | Coulmeau et al. | 701/16 |
| 2009/0171519 | A1* | 7/2009 | Closse et al. | 701/16 |
| 2009/0214080 | A1* | 8/2009 | Hamza et al. | 382/103 |
| 2010/0039294 | A1* | 2/2010 | Feyereisen et al. | 340/972 |

* cited by examiner

METHOD AND SYSTEM FOR RESOLVING TRAFFIC CONFLICTS IN TAKE-OFF AND LANDING

FIELD OF THE INVENTION

The present invention relates to a method and system for resolving traffic or other physical conflicts that may occur during take-off and landing.

BACKGROUND OF THE INVENTION

Aircraft are constantly operating in close proximity of other aircraft and, on the ground, also in close proximity of other vehicles and obstacles. Separation from such hazards, therefore, is of prime importance in assuring the safe continuation of a flight. In flights operating under Visual Flying Rules (VFR), the responsibility of separation lies with the pilot. Separation is normally ensured through good situational awareness of traffic in the vicinity of the ownship. This is traditionally achieved by keeping a good look-out and through radio communication, which allows the crew to build a mental picture of the traffic movements in the vicinity. Under Instrument Flying Rules (IFR), separation is the responsibility of air traffic control (ATC), where the air traffic control officer (ATCO) directs traffic in such a way to ensure safe separation between all entities.

In controlled airfields, the ATCO is responsible for the control of traffic in and around the airfield and it is the ATCO who provides clearances for aircraft to enter a runway, take-off or land. It is therefore the ATCO who ensures that any movements are well clear of the particular aircraft in take-off or landing. In essence, the ATCO reserves the runway (or a portion of it) for the exclusive use of this aircraft and procedures are rigorously followed to ensure safe separation from other aircraft. Nevertheless, it is good airmanship for pilots to independently ensure that they are cleared to enter a runway, land on it or take-off, that the approaches of a runway are indeed clear before entering it and, before taking off or landing, that the runway itself is clear. Such actions are, of course, more effective in situations of good visibility and in reduced visibility and bad weather, pilots and ATCOs are more careful to ensure that separation is indeed maintained. In fact, reduced visibility operations are subject to more stringent separation rules, where separation between aircraft is intentionally increased and certain manoeuvres are not allowed.

Therefore, whereas the procedure dictates that the ATCO is responsible for traffic separation, the pilot also plays an active role in ensuring that the required separation is indeed preserved. The pilot also plays a critical role in restoring this separation when it is lost and this role is essential for the mitigation of the risk of collision.

Positional and traffic situational awareness are fundamental in maintaining safe separation between aircraft and this is generally achieved through good communication on voice radio, which allows the relevant parties to build a mental picture of all movements in the vicinity.

However, notwithstanding rigorous procedure, training and good practice, the current procedural method of maintaining separation is prone to failure. This repeatedly results in aircraft (and vehicles) coming in conflict with one another on the runway. Indeed, in the US alone, during the period 2003 to 2006, 1306 runway incursions have been reported [*FAA Runway Safety Report,* September 2007, Federal Aviation Administration]. The FAA then defined runway incursion as any occurrence in the airport runway environment involving an aircraft, vehicle, person or object on the ground that creates a collision hazard or results in a loss of required separation with an aircraft taking off, intending to take off, landing or intending to land. In October 2007, the FAA adopted the ICAO definition, which defines a runway incursion as any occurrence at an aerodrome involving the incorrect presence of an aircraft, vehicle, or person on the protected area of a surface designated for the landing and take-off of an aircraft.

Current procedure, therefore, can be considered unsatisfactory and needs to be complemented by a means that monitors traffic in the vicinity and warns the pilot accordingly. In a way, a sort of 'electronic-supervisor' is required in order to complement the pilot (or ATCO) and to provide appropriate advice when he or she fails to see or detect the conflict.

PRIOR ART

A number of solutions have been proposed in an attempt to mitigate the risk of runway collision. These can conceptually be divided into two categories, namely ground-based systems that are installed in an airport, and airborne solutions that are installed on board aircraft (and are therefore not airport specific).

Ground-based systems generally depend on sensors and other equipment installed at various locations on the airfield. One such system is Northrop Grumman's Nova 9000 Runway Incursion Monitoring and Conflict Alert System (RIMCAS) that provides an alert of a conflict to the ATCO, who is then expected to take positive action to resolve the conflict. Another method and system that also provides situational awareness to the ATCO is described in U.S. Pat. No. 5,629,691 (Jain). A third example that proposes the monitoring of aircraft and vehicles on the ground to alert flight controllers is disclosed in U.S. Pat. No. 6,486,825 (Smithey). Yet another ground-based system, disclosed in U.S. Pat. No. 6,920,390 (Mallet et al.), uses sensors to locate aircraft position and displays route guidance information to vehicles and aircraft via boards installed at various positions on the airfield. This system is primarily aimed at reducing inadvertent entry into a runway whilst taxying, usually the result of lost or disoriented pilots. It therefore targets taxying aircraft and not aircraft in take-off or landing. Another proposal, described in U.S. Pat. No. 7,117,089 (Khatwa et al.) describes a Ground Runway Awareness and Advisory System (GRAAS) intended to provide aural situational awareness to vehicle operators and pedestrians, optionally supplemented with a video display. The equipment would either be hand held or installed in the ground vehicle.

Although ground-based systems have been shown to be effective at reducing runway incursions, the above methods only provide a partial solution to the problem of runway traffic conflicts. This is because, in the prior art, the aircraft in take-off or in landing (one of the parties usually involved in the runway conflict) is either not advised at all by the system (e.g. GRAAS) or is advised indirectly, through ATCO voice communication. Whilst the former does not provide protection to the aircraft in take-off or landing, the latter will incur a delay between system alert and pilot reaction. This is inadequate, since reaction time may be critical for the safe avoidance of the collision threat. A further limitation is that such ground-based systems depend on the ATCO transmitting the correct instruction in a timely, efficient and unambiguous manner over the radio. In critical situations, this may be demanding and indeed may even not be managed adequately, as exemplified by a number of known transcripts of runway incursion incidents. Such limitations clearly jeopardise the effectiveness of the alerting system in critical situations. Furthermore, ground-based systems depend on the installation of the equipment by the airport and/or air traffic service provider of the airport. Consequently, protection will only be available at airports where such systems are installed. This is a significant limitation, particularly considering that today, still only a small number of airports are equipped with runway incursion alerting systems.

Airborne solutions mitigate the said shortcomings by being independent of airport equipment and by providing primary information directly to the crew of the aircraft in take-off or landing. One example of an airborne system is described in U.S. Pat. No. 6,606,563 (Corcoran, III). This system is designed to mitigate the risk of runway incursion by providing alerts to the pilot that he or she is approaching or has entered a 'zone of awareness' such as a particular runway. The system, however, operates independently of other traffic and specifically does not identify or alert runway conflicts. The patent was continued in other patents by the assignee (Honeywell International Inc.), including U.S. Pat. No. 7,117,089 (Khatwa) described earlier and U.S. Pat. No. 7,206,698 (Conner et al.). The latter discloses a display device to display airport survey data (such as runways) and the plotting of third party aircraft data (such as position) received from RF broadcasts. The system also provides means of determining potential conflicts with such traffic and to generate advisories accordingly. A portion of the described system is the Aircraft Position Situational Awareness System (APSAS). APSAS determines the position of the aircraft relative to the airport, receives broadcasts from other aircraft and determines whether potential conflicts in the occupation of runways exists. The system graphically displays the ownship and other aircraft position in relation to the runway and annunciates potential conflicts. The aural alert indicates that a runway being approached or entered is occupied, being vacated or being approached by another vehicle. In a further extension of this system, U.S. Pat. No. 7,363,145 (Conner et al.) discloses a method for annunciating imminent landing situational advisories, but these are not related to runway conflicts.

Another system that identifies runway conflicts is described in U.S. Pat. No. 6,850,185 (Woodell). The document describes a system based on airborne radar intended to identify any obstacle on the runway and to alert the crew of the presence of the obstacle.

The alerting of a conflict directly on the aircraft in take-off or landing is an improvement over the current operational standard. Indeed, recent prior art proposing ground-based systems have also incorporated the alerting of a conflict directly to the crew on the aircraft, as disclosed in U.S. Pat. No. 7,385,527 (Clavier) and U.S. Pat. No. 7,535,404 (Corrigan). However, these systems generate only advisory alerts, that is, alerts relating to the existence or the potential existence of a conflict. This again provides only partial protection, since alerts that are generated simply on the basis of the existence of a conflict (that is, without taking into account the conflict dynamics and aircraft performance) cannot reliably relate to how a conflict should be resolved. As a result, alerts generated by prior art such as that referred to above, still require the crew to take the following steps to successfully resolve the conflict following its annunciation:

1) identify the conflict (conflict aircraft and its position in relation to the ownship), typically via the graphical display
2) determinate a manoeuvre that will successfully resolve the conflict
3) decide to execute the manoeuvre
4) execute the manoeuvre.

Steps 1 to 3 increase crew workload in critical moments during take-off and landing and can take several seconds to complete under normal working conditions. It is immediately appreciated by those knowledgeable in the art, however, that the take-off and landing phases of flight impose high workload and operational pressures to the pilot, particularly in bad weather conditions. An additional complication is that during these phases of flight, situations that may be hazardous to the safe continuation of the flight may develop very quickly and with very little warning. It is also well known that human decision-making capabilities and reaction times are compromised when workloads are high and when threatening situations are announced without prior warning. As a result, in such circumstances, the risk of the pilot erring in any of the above steps, thereby breaking the path to successful mitigation of the conflict, is significant. Indeed, in the operational environment, the mental processing and subsequent decision taking relating to runway conflicts can be demanding, is subject to hesitation and even erroneous conclusions. Another consideration is that, during take-off, it may not be possible for the crew to identify very quickly from a graphical display (particularly in critical circumstances) whether it is better to abort the run and to stop before the conflict, or to continue the take-off and overfly it safely.

Consequently, the method of providing an aural alert that only advises the crew of the existence or potential existence of a conflict will require the pilot to carry out all the four named steps and therefore provides only a partial solution to runway conflicts due to the described limitations.

Honeywell International Inc. discloses a method and system of avoiding runway collisions in U.S. Pat. No. 7,479,925. The method described is based on identifying three restricted zones associated with a runway and its environs and generating an aural advisory message and signals according to the presence of aircraft within these restricted zones. For example, an audible warning may include 'Traffic on Runway' or 'Traffic on Approach'. The system depends on aircraft communicating via a wireless communication system that is programmed to receive messages from other aircraft if positioned off an active runway on the ground, and to transmit and receive messages if it is on the runway or airborne on approach. In this way, an aircraft on approach or on the runway can indicate their presence, whilst other aircraft can receive such messages.

As this method also generates alerts based only on the presence of a conflict, it too cannot provide reliable means of generating an output relating to the resolution of a conflict and therefore likewise can only provide partial protection against runway collisions.

In order to provide a fast, reliable and repeatable response to a conflict in a cockpit, it is advantageous to at least eliminate or automate at least the first two steps above. This can be done by a system that also determines an escape manoeuvre and then generates an output pertaining to that escape manoeuvre. It is immediately appreciated by those knowledgeable in the art that the reliable calculation of a feasible escape manoeuvre requires the consideration of the dynamics of the conflict and the performance of the aircraft that is expected to execute the escape manoeuvre.

SUMMARY OF THE PRESENT INVENTION

There exists a need, therefore, for a system that monitors the traffic movements in the vicinity of the ownship and its intended path, that determines whether a conflict or potential conflict exists and determines an escape manoeuvre that will successfully resolve the conflict.

The present invention provides a method and system that facilitate the successful mitigation of traffic conflicts by overcoming at least some of the limitations of prior art.

According to the present invention, there is provided a method that detects or monitors the presence of traffic or obstacles in the vicinity of the ownship or its intended path, that determines whether a conflict or potential conflict exists, that determines an escape manoeuvre that will successfully resolve the conflict and generates an output pertaining to the determined manoeuvre.

By detecting or monitoring the presence of traffic or obstacles in the vicinity of the ownship and its intended path, the method is capable of identifying whether the target presents a threat by coming or potentially coming in conflict with the ownship.

Advantageously, the detection or monitoring process may refer to a database containing runway and airport survey data to determine the position of traffic in relation to particular areas, zones or locations in an airfield such as a runway or its threshold.

Advantageously, the determination of the existence or potential existence of a conflict is based on the position and state of the ownship in relation to the position or geometry of the airfield and in relation to the position and state of the target traffic or obstacle.

By determining an escape manoeuvre that will successfully resolve the conflict, the method is capable of relieving the crew of the decision of how to mitigate the conflict, thus providing a better method of mitigating the threat of collision.

Advantageously, the determination of the escape manoeuvre takes into account the position and state of the ownship in relation to the position and geometry of the airfield and in relation to the position and states of the conflict traffic or obstacle.

Advantageously, the determination of the escape manoeuvre takes into account the performance of the ownship to ensure that the said manoeuvre can be successfully executed.

Advantageously, the method provides an output that relates to the manoeuvre to be executed. The output may be, but is not restricted to, an aural alert or message, a visual alert, an electrical or electronic signal, or a combination thereof. The electrical or electronic signal may stimulate or direct means of controlling the aircraft such as the flight guidance computer on board the ownship.

According to another aspect of the present invention, a plurality of escape manoeuvres may be determined and one is selected on the basis of pre-defined criteria.

According to another aspect of the present invention, the method may include steps for providing graphical means of displaying the position of the ownship in relation to the position and layout of the airfield and in relation to the position and states of the conflict traffic or obstacle. In addition, other traffic or obstacles that may not be in conflict with the ownship may also be displayed.

By displaying the airfield traffic and obstacles, the method provides enhanced situational awareness in relation to traffic conflicts and their mitigation.

According to yet another aspect of the present invention, the method may include steps for communicating with other traffic. Advantageously, by communicating with other traffic, the escape manoeuvres of the ownship and the other traffic with which it is in conflict can be coordinated.

Preferably, through coordination, the escape manoeuvre is determined collaboratively with the conflict traffic. Advantageously, by determining the escape manoeuvre collaboratively, the conflict can be resolved with minimal disruption to operations whilst maintaining the necessary levels of safety in the circumstances.

According to another aspect of the present invention, the method may include steps for communicating with air traffic control. Advantageously, by communicating with air traffic control, the air traffic control officer can be warned of the conflict and advised of the escape manoeuvre made by the aircraft.

According to a further aspect of the invention, there is provided a system, including data acquisition means, a data processing device and output means, the system being constructed and arranged to operate in according to a method as defined by the present invention.

According to the present invention, there is provided a system that detects or monitors the presence of traffic or obstacles in the vicinity of the ownship and its intended path, that determines whether a conflict or potential conflict exists, that determines an escape manoeuvre that will successfully resolve the conflict and generates an output pertaining to the determined manoeuvre.

According to a further aspect of the invention, the output means may include an aural alerting system, a graphic display, means for electrically or electronically transmitting the output, or combinations thereof.

According to a further aspect of the invention, the system may include a wireless datalink to support the electronic communication between the ownship and other aircraft for the coordination and cooperative resolution of the conflict.

According to a further aspect of the invention, the wireless datalink may communicate with air traffic control to provide an alert pertaining to the conflict and information pertaining to the action taken to resolve the conflict.

DETAILED DESCRIPTION OF A PREFERRED EMBODIMENT

An embodiment of the invention will now be described with reference to the accompanying drawings, in which:

FIG. 1 illustrates the block diagram of one embodiment of the disclosed system;

FIG. 2 presents an example of a runway incursion, with an aircraft approaching a runway to land and another aircraft entering the runway;

Figure 2:
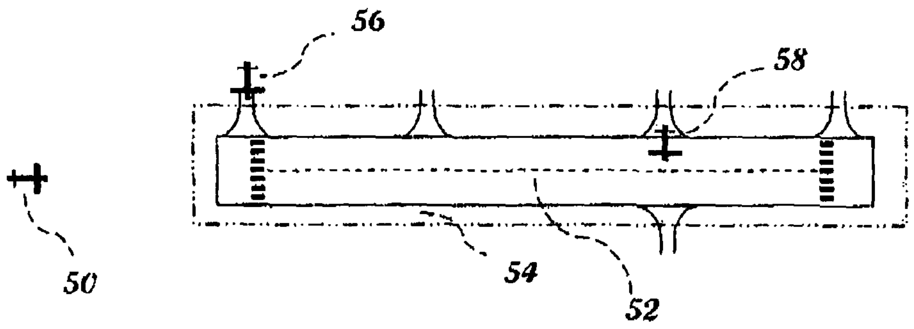

In the preferred embodiment, conflict detection is based on the definition of a 'protected zone' around a runway. As a runway is essentially reserved for an aircraft conducting a take-off or landing, the 'protected zone' defines the area that is effectively reserved exclusively to the said aircraft during the manoeuvre. The extent of the 'protected zone' depends, amongst other factors, on the runway geometry and ownship manoeuvre. If another aircraft, vehicle or obstacle enters the 'protected zone' it may come in conflict with the ownship. The scenario depicted in FIG. 2 only illustrates a typical conflict situation and it is understood that many different situations can exist, for both take-off and landing. In this example, the aircraft equipped with the system, referred to as the 'ownship' (50), is approaching the runway (52) to land. The 'protected zone' (54) includes the runway, its approaches and the immediate environs. Other aircraft (56, 58) are manoeuvring in the vicinity of the runway. In the example depicted in FIG. 2, one aircraft (56) is just outside the 'protected zone' and therefore does not come in conflict with the ownship, whilst another (58) is within the 'protected zone' and therefore comes in potential conflict with the ownship. An aircraft within the 'protected zone' is referred to as an 'intruder'.

Figure 3:
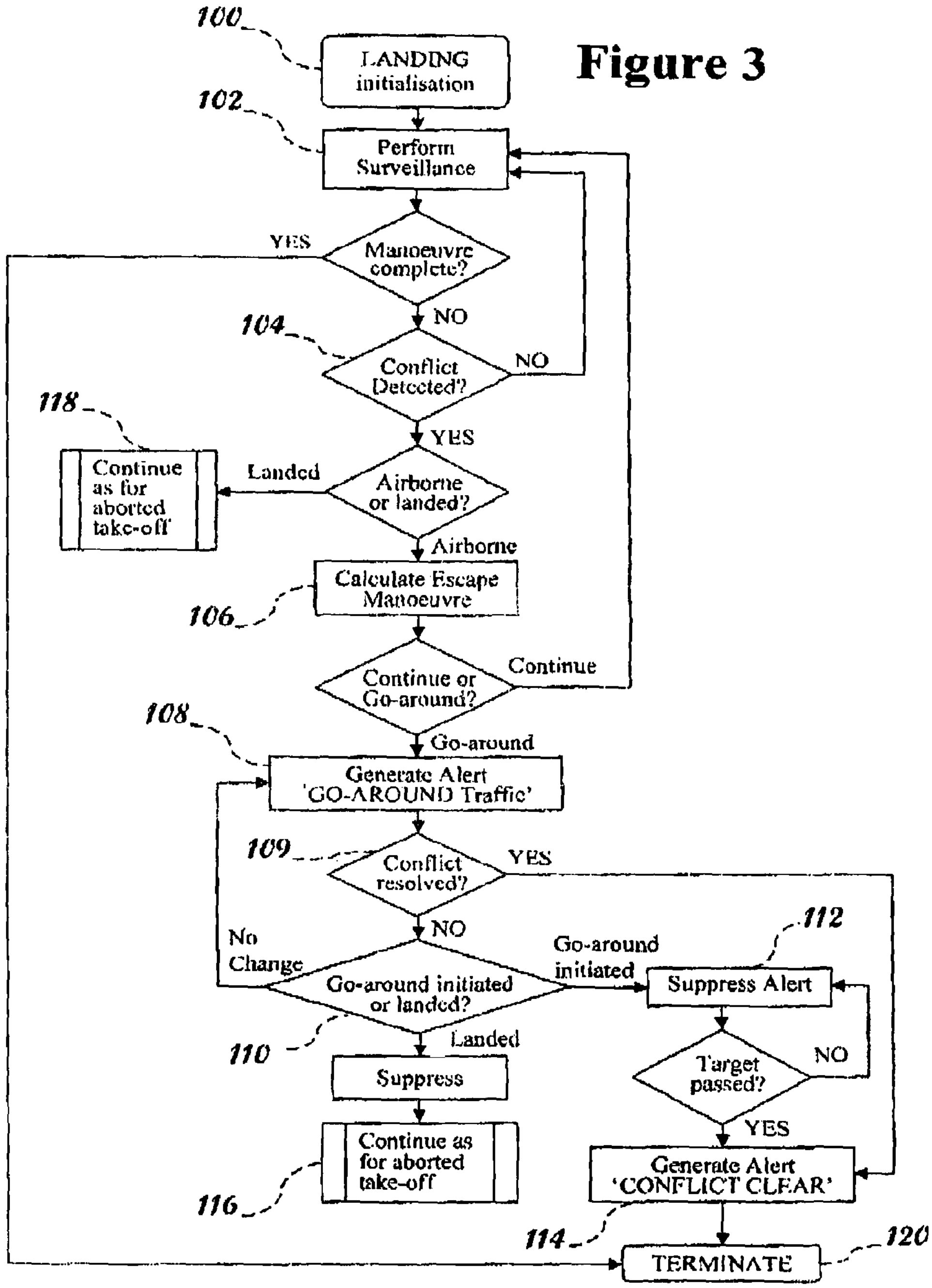
FIGS. 3 and 4 are flow diagrams illustrating the main steps of the conflict alerting method for take-off and landing in a preferred embodiment of the disclosed system.

The main steps of the alerting process carried out during landing in a preferred embodiment of the disclosed system are shown in FIG. 3. In this process, initialisation is done automatically as the ownship approaches the runway to land (100). The correct runway on which the landing will be carried out is identified automatically and the system retrieves geographical information pertaining to the runway and its environs from a database. On initialisation, it will initiate surveillance (102) and will monitor movements (including other traffic and vehicles) ahead of the aircraft and in the vicinity of the runway and the aircraft's intended path. Such a surveillance function may be obtained through new technologies such as ADS-B, other sensors such as radar, or a combination of such systems through the employment of sensor fusion techniques. The landing surveillance terminates (120) when the landing manoeuvre is complete, typically either when the aircraft slows down to taxi speed or will have initiated a go-around. It is understood that the surveillance function is not necessarily dedicated to the embodiment of the disclosed method and system, but may, for example, be part of an overall surveillance function on board the ownship. In such embodiments, the surveillance function may not terminate when the landing is complete and continue to provide surveillance during other phases of flight.

The surveillance function uses vector notation to represent positional and kinematic information of targets and the ownship as well as airfield geometry and geometry of the 'protected zone'. Depending on the type of data acquisition system, transformations are carried out to translate the information into a 2-dimensional, flat earth plot. For example, ADS-B derived data provides positional information in the form of latitude and longitude. This is translated first to Cartesian coordinates referenced to earth-centred, earth-fixed (ECEF) axes and then to axes referenced to the runway threshold.

Figure 5:
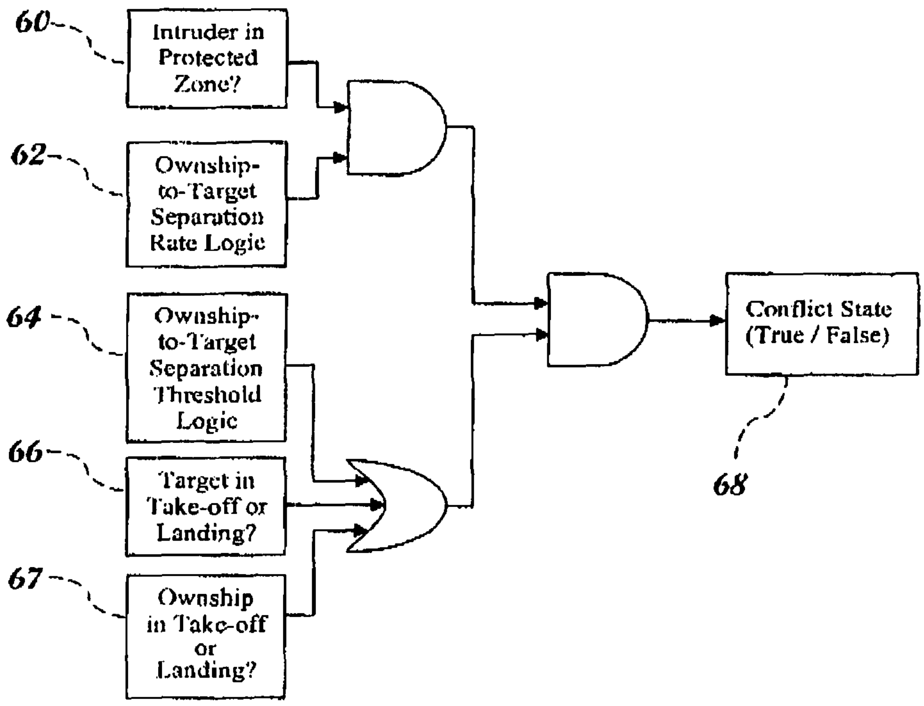
FIG. 5 illustrates schematically the preferred conflict state logic.

As the aircraft approaches the runway, the surveillance function assigns the runway (or a portion of it) to the ownship and creates a 'protected zone' around it. Nominally, the 'protected zone' is assigned to the ownship 30 seconds before it flies over the runway threshold. This length of time, however, may be assigned a different value. Preferably, a conflict is detected (104) in accordance to the logic presented in FIG. 5. The Conflict State (68) is set to True when a target enters the 'protected zone' (60), the separation between the ownship and the target is decreasing (62) and logic rules associated with separation minima and the flight phase (manoeuvre) of the ownship and conflict entity are satisfied (64, 66, 67). It is understood that this logic is only one example of the embodiment of the method disclosed and different logic functions can be applied within the scope of the invention.

On the identification of a conflict, according to FIG. 3, a conflict resolution computer determines whether either option of continuing the landing and aborting it (performing a go-around) are feasible to mitigate the threat of collision and determines the preferred option (106). This calculation includes ownship performance calculations. In the event the continuation of the landing is preferred, the alert is suppressed. If, on the other hand, a go-around is warranted, a directive alert, advising the pilot to go-around, such as 'Go-Around . . . Traffic' is generated (108). Such an alert, which may be preceded by a unique sound (often referred to as a gong or bell), would direct the pilot to immediately initiate the manoeuvre whilst giving a reason for the instruction. The particular tone and the nature and specific wording of the alert may differ, depending on precise flight deck aural alerting philosophy of the particular aircraft. The alert may be repeated, nominally every 4 seconds until the conflict is resolved or the directive alert is followed (109). When the conflict is resolved, a 'conflict clear' alert is generated (114). In the event the aircraft has landed, the steps followed will be identical to those of an aborted take-off (116, 188).

Figure 4:
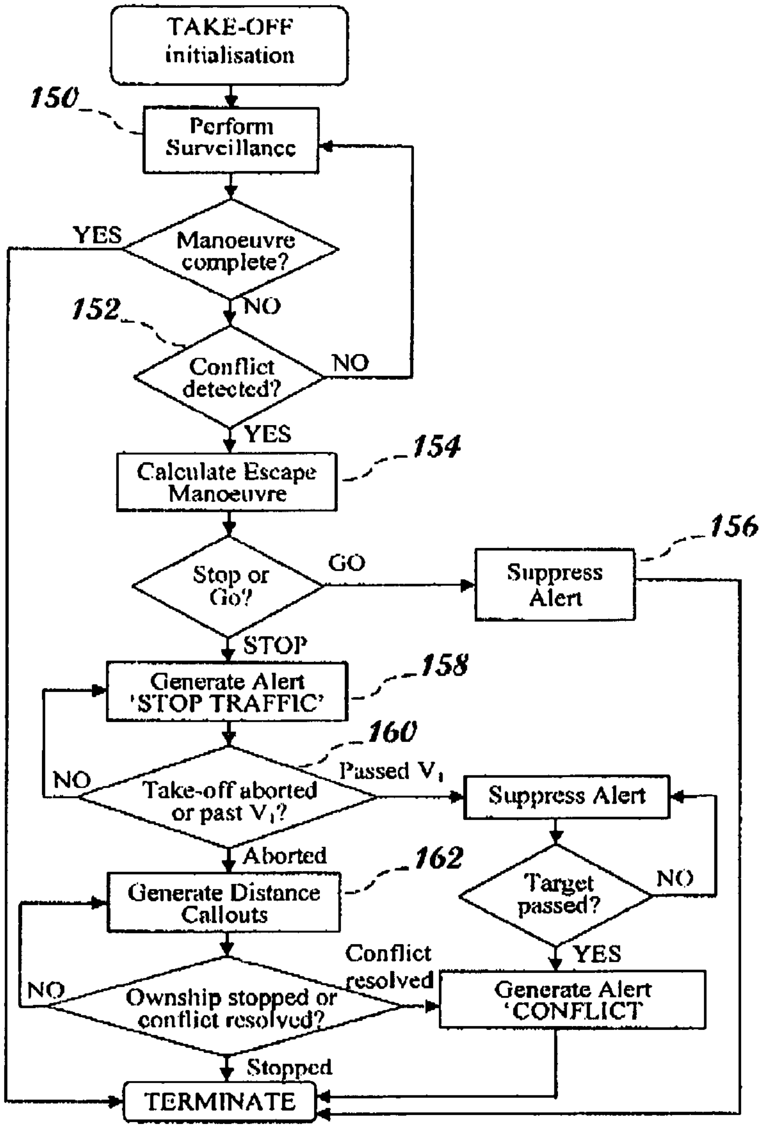

In the case of take-off (FIG. 4), the function provides similar surveillance (150) and conflict detection (152). The conflict resolution computer determines whether it is safer to continue the take-off manoeuvre or to abort the run (154) and will suppress any alert in the former case (156). A 'Stop . . . Traffic' alert is generated (158) to direct the crew to abort the run if the run is to be aborted. The exact wording and nature of the alert may vary and the alert may be likewise preceded by a bell or gong. As in the case for landing, the alert may be repeated, nominally every 4 seconds, until the conflict is resolved (not shown in FIG. 4), the aircraft will have passed a critical speed (typically, but not limited to, $V_1$) or an abort initiated (160).

If a take-off is aborted, distance call-outs to the intruder are generated (162), nominally every 200 m above 1000 m and every 100 m for smaller separations until the closure rate falls below a threshold, nominally set at 20 kts. It is understood that the exact wording, thresholds and other cues can vary and any appropriate wording or values can be used.

Distance call-outs are also generated during landing in the event the ownship continues the landing manoeuvre, as shown in FIG. 3 (116, 118).

A variety of performance equations known to those knowledgeable in the art can be used by the performance calculator to determine whether a potential ownship manoeuvre can resolve a conflict. A preferred method uses scheduled aircraft performance data that is modified to take into account the actual progress of the ownship in the manoeuvre.

The method and system of the present invention can also provide surveillance and resolve traffic conflicts that may occur whilst the ownship is taxying on the runway or in its environs. For example, in a preferred embodiment, whilst taxying towards or on the runway, the surveillance computer monitors the runway and its approaches to determine whether any aircraft is taking off or landing. If the conflict detection computer detects a conflict or potential conflict, it determines an escape manoeuvre, typically by estimating whether the ownship can stop before entering the runway or vacate the runway safely to resolve the conflict. It then generates alerts pertaining to the preferred manoeuvre. Preferably, an aural alert such as 'Stop—Runway Incursion' and 'Vacate Runway—Traffic' are generated.

Advisory alerts may also be generated. For example, if an aircraft is detected on approach to a runway and the ownship is taxying towards its extended path, a 'Traffic on Approach' alert may be generated.

Preferably, the steps calculating the escape manoeuvre (106, 154) include steps that can support cooperative conflict resolution with the intruder aircraft. If the intruder aircraft is also equipped with this capability, this would allow conflict resolution to be achieved with minimal disruption or risk of accident. For example, if the ownship is advanced in the take-off run and an aircraft enters the 'protected zone' (thus becoming a 'intruder'), it may be advantageous to resolve the conflict by stopping the intruder before it crosses the projected path of the ownship, whilst allowing the ownship to continue the take-off. Without cooperative resolution, the ownship cannot take into account any escape manoeuvre conducted by the intruder and may have to abort the run to avoid a collision. The cooperative conflict resolution capability thus allows, in this example, the conflict to be resolved without the ownship having to carry out a high speed abort. Such a manoeuvre always introduces a risk of disruption to operations, damage and injury and is normally avoided unless the risks associated with continuing the take-off are higher. It is evident, therefore, that cooperative conflict resolution can offer better solutions to a conflict on the runway.

Figure 6:
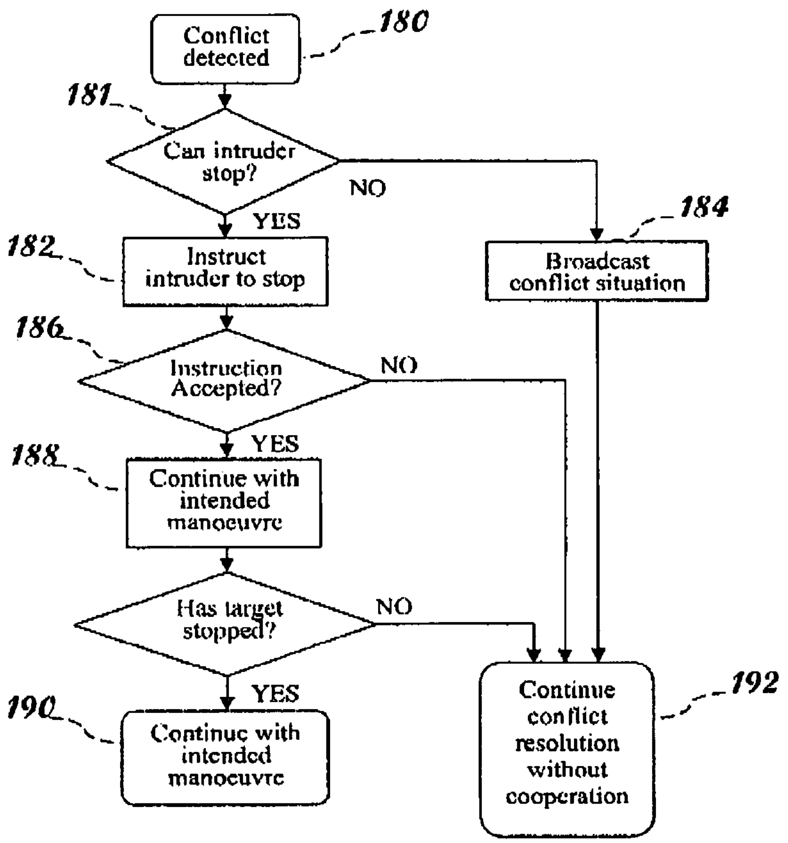
FIG. 6 is a flow diagram illustrating the main steps of a collaborative decision making process.

A variety of methods for cooperative conflict resolution can be employed. The steps of one method are shown in FIG. 6, which is simplified for clarity. In this method, as the system on board the aircraft performing the take-off or landing detects a conflict with an intruder in the 'protected zone' (180), it determines whether the intruder can stop before physically entering the runway (181). If this is not the case, as, for example, when the intruder is already on the runway, the ownship broadcasts the conflict situation (184) and continues to resolve the conflict independently of the intruder (192). If, however, the intruder is capable of stopping, the ownship will broadcast an instruction for the intruder to stop (182). This may take the format, for example, of a repeated radio transmission of a digital message that also contains other information pertaining to the conflict (such as, but not limited to, aircraft and runway identification information). The system then waits for a predetermined period, such as, but not limited to, 0.3 seconds, for acknowledgement (or agreement) from the intruder. If no acknowledgement is received, the system continues to resolve the conflict independently of the intruder (192). If the intruder transmits the acknowledgement, the system continues to monitor the intruder to verify that it has indeed stopped short of the runway, allowing the ownship to proceed with its manoeuvre (190) which may be either to continue with the original intentions prior to the conflict or to abort (go-around in the case of a landing, stop in the case of a take-off). Furthermore, in this method, if the system on board the aircraft taxying on the runway or its environs detects a conflict with an intruder in the 'protected zone', it determines whether the ownship can stop prior to entering the runway or vacate it in time and then broadcasts a message pertaining to the conflict. It may also transmit a message pertaining to the escape manoeuvre being executed. If the taxying aircraft receives a message instructing it to stop from an intruder that is taking off or landing, the conflict resolution computer determines whether the ownship can indeed resolve the conflict by stopping and transmits a reply pertaining to the conflict resolution computer's output. In this way, the taxying aircraft will be acknowledging or otherwise the instruction transmitted by the other aircraft in take-off or landing.

When both the ownship and the intruder are equipped with a system according to the invention, both are independently capable of detecting the conflict. Consequently, it is possible for both entities to simultaneously attempt to broadcast the conflict situation. Accordingly, the present invention includes means for message separation. These means can use, for example, but are not limited to, known frequency multiplexing or time division multiplexing techniques to allow simultaneous transmissions of messages.

It is understood that many variations of the above steps can be made without departing from the spirit and scope of the invention. Variations may be due to, but are not limited to, the capabilities and equipment installed on the ownship. For example, the result of the steps calculating the escape manoeuvre (106, 154) can be used to control the automatic guidance system such as the autopilot on board the aircraft. In this case, the aural alerts generated may be different and be informative rather than directive in nature.

Figure 1:
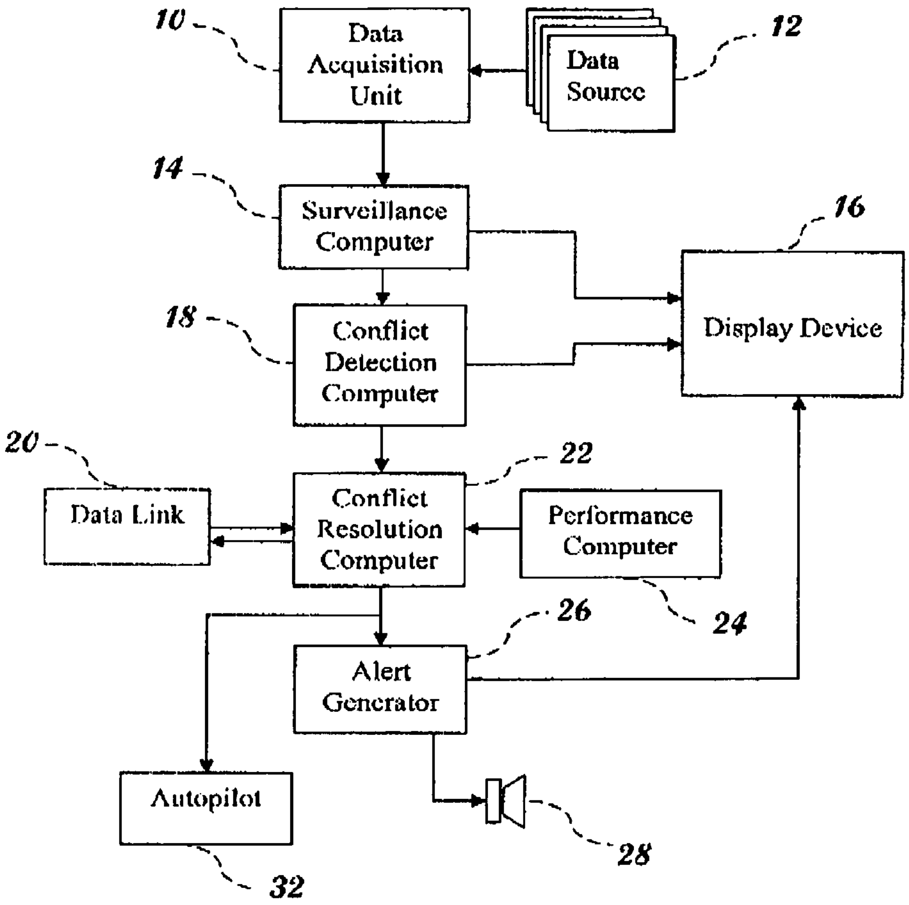

The main components of one embodiment of the system disclosed are shown schematically in FIG. 1. The Data Acquisition Unit (10) consolidates data from a plurality of sources (12) such as, but not limited to, ADS-B, Radar, the Flight Management System, Air Data Computer, navigation computer, etc. Preferably, one of the sources also includes a database containing airfield survey data.

The output from the Data Acquisition Unit (10) is transmitted to the Surveillance Computer (14), which carries out the surveillance function. The Surveillance function identifies the 'protected zone' around the runway and monitors movements (bodies, vehicles or aircraft) to determine whether these are within this 'protected zone' or otherwise. The Conflict Detection Computer (18) determines whether aircraft within the 'protected zone' constitute a threat or risk of conflict with the ownship, using state information from the ownship and the target aircraft. The Conflict Resolution Computer (22) uses performance data of the ownship sourced from the Performance Computer (24) to compute an escape manoeuvre to allow the ownship to avoid a collision with the intruder. If the ownship and intruder aircraft are equipped with cooperative conflict resolution capability, the Conflict Resolution Computer communicates with its counterpart on the intruder aircraft via a wireless Data Link (20). The output of the Conflict Resolution Computer is transmitted to the Alert Generator (26). The Alert Generator, which may include alert prioritisation algorithms, will generate alerts via the audio system (28) and, optionally, graphically via a Display Device (16). The Display Device may typically involve existing equipment on the aircraft such as the Primary Flight Display, Navigation Display or a Cockpit Display of Traffic Information (CDTI). In addition, the surveillance computer may optionally generate outputs on the Display Device (16), including outputs pertaining to the relative positions of the ownship and targets with respect to the geographic position and orientation of the airfield or runway.

In one embodiment of the system, the output of the Conflict Resolution Computer is transmitted to the automatic guidance device of the ownship (32).

The invention claimed is:

1. A method of resolving runway conflicts during an approach to a runway, a landing and a takeoff, the method comprising:

detecting a presence of traffic and mobile obstacles in at least one of a vicinity of an aircraft and an intended path of the aircraft, during an approach to a runway, a landing and a take-off;

determining whether at least one of a conflict and a potential conflict exists based on the detected traffic;

then determining, via a processing device, an escape manoeuvre based on the geometry and dynamics of the at least one conflict and potential conflict that will successfully resolve the at least one conflict and potential conflict; and generating an output pertaining to the determined manoeuvre.

2. The method of claim 1, wherein a performance of the aircraft to determine is used to determine the manoeuvre to resolve the at least one conflict and potential conflict.

3. The method of claim 2, wherein scheduled performance data is used to determine the manoeuvre to resolve the at least conflict and potential conflict.

4. The method of claim 1, wherein a directive aural alert or an instruction is generated.

5. The method of claim 4, wherein the aural alert directs a pilot to perform at least one of a go-around during landing, a stop during take-off, and a stop during taxi as the aircraft approaches the runway.

6. The method of claim 1, wherein the aircraft is triggered to automatically execute the determined manoeuvre.

7. The method of claim 1, further including generating aural alerts pertaining to distances to the at least one conflict and potential conflict.

8. The method of claim 1, further including generating aural alerts advising a pilot that the at least one conflict and potential conflict is resolved when the conflict or potential conflict is resolved.

9. The method of claim 1, further including storing and retrieving runway and airport survey data.

10. The method of claim 1, further including displaying on a graphical display a position of the aircraft with respect to the runway or other geographical point on an airfield.

11. The method of claim 10, further including displaying on a graphical display other traffic in relation to geographic points on the airfield and in relation to the aircraft.

12. The method of claim 1, further including communicating, via a communication device, with other aircraft, vehicles or entities to enable coordination of a conflict resolution manoeuvre.

13. The method of claim 12, wherein information pertaining to the determined conflict or potential conflict is transmitted.

14. The method of claim 1, further including resolving the at least one conflict and potential conflict in coordination with at least one of a conflict traffic and a conflict moving obstacle.

15. A system for resolving runway conflicts, that monitors and detects a presence of traffic and mobile obstacles in a vicinity of an aircraft and an intended path of the aircraft during an approach to a runway, a landing, and a take-off, that determines whether at least one of a conflict and a potential conflict exists, that determines an escape manoeuvre that will successfully resolve the at least one conflict and potential conflict and generates an output pertaining to the determined manoeuvre, the system including a data acquisition device, a data processing device, and an output device to generate an output pertaining to the determined manoeuvre.

16. The system of claim 15, wherein the output device includes an audio device.

17. The system of claim 15, wherein the output device includes a display device.

18. The system of claim 15, wherein the output device is electrically connected to a guidance system of the aircraft.

19. The system of claim 15, further including a data storage device for storing and retrieving runway and airport survey data.

20. The system of claim 15, further including a wireless datalink device for communicating with other aircraft, vehicles and entities to enable coordination of a conflict resolution manoeuvre.

21. The method of claim 1, further including obtaining positional and kinematic information of the detected traffic using vector notation of the detected traffic and the aircraft.

* * * * *